United States Patent [19]
Nguyen et al.

[11] Patent Number: 5,209,134
[45] Date of Patent: May 11, 1993

[54] SYNCHRONOUS BIDIRECTIONAL GEARING MECHANISM

[75] Inventors: David Nguyen, Sunnyvale; Dexter Francis, Los Altos, both of Calif.

[73] Assignee: Apple Computer, Inc., Cupertino, Calif.

[21] Appl. No.: 782,004

[22] Filed: Oct. 22, 1991

[51] Int. Cl.[5] .............................................. F16H 55/17
[52] U.S. Cl. .................................. 74/437; 74/412 R; 74/414; 74/457
[58] Field of Search .................... 74/412 R, 414, 437, 74/457, 462

[56] References Cited

U.S. PATENT DOCUMENTS

| | | | |
|---|---|---|---|
| 99,683 | 2/1870 | Johnson | 74/462 X |
| 2,584,558 | 2/1952 | Costa | 74/437 |
| 3,098,399 | 7/1963 | Berthiaume | 74/437 X |
| 4,685,348 | 8/1987 | Takami | 74/437 |
| 4,765,195 | 8/1988 | Takami | 74/437 X |

FOREIGN PATENT DOCUMENTS

| | | | |
|---|---|---|---|
| 452468 | 3/1913 | France | 74/437 |
| 445787 | 4/1936 | United Kingdom | 74/437 |
| 676537 | 7/1952 | United Kingdom | 74/462 |

OTHER PUBLICATIONS

Product Engineering, "When You Need Noncircular Gears", Mar. 14, 1960.

Primary Examiner—Leslie A. Braun
Assistant Examiner—William O. Trousdell
Attorney, Agent, or Firm—Stuart J. Madsen

[57] ABSTRACT

A bidirectional synchronous gearing mechanism includes a first gear with a first and second gear profile and a second gear identical to the first gear and with identical first and second gear profiles. The teeth of the two gears are meshed together and the gears are rotatably secured about their respective central axes. Rotation of one of the gears causes rotation of the other gear in an opposite direction.

3 Claims, 3 Drawing Sheets

SYNCHRONOUS BIDIRECTIONAL GEARING MECHANISM

BACKGROUND OF THE INVENTION

1. Field of the Invention:

The present invention relates generally to gears and gearing mechanisms, and more particularly to a synchronous bidirectional gearing mechanism having a high-strength, limited-rotation gear profile amenable to production in a single integral design.

2. Brief Description of the Field:

Gears and gearing mechanisms are used in a variety of disparate fields, oftentimes comprising an integral component of a functional device. The specific design of a particular gear almost invariably depends on the environment in which it operates as well as its designated function in that environment. Contemporary generic gear tooth forms are characterized by symmetrical distribution with respect to a central rotational axis, and are designed to transmit torque in both clockwise and counter-clockwise directions of gear rotation. This type of design generalization compromises the strength of the gear teeth, reducing them in principle to simple cantilever beams. Unfortunately, these teeth often weaken from continuous pressure, eventually breaking down or freezing. Additionally, the traditional gear profile is susceptible to manufacturing flaws which cause inherent weaknesses in overall gear strength and reliability.

SUMMARY OF THE INVENTION

The synchronizing gear in accordance with the preferred embodiment of the present invention effectively obviates the infirmities associated with the prior art devices by providing a gear profile which allows transmission of force in only one direction of gear rotation. This design enables a tooth in accordance with the present invention to be significantly thicker than a prior art gear tooth, and therefore stronger and more reliable.

Briefly, the present gear includes a modified, asymmetric gear tooth shape, useful over a relatively small angle of rotation. In the preferred embodiment, a single gear includes a pair of teeth having contact faces which are true involutes to prevent speed oscillations across the range of gear motion. By repeating the profiles around the gear minor diameter at large intervals, it is possible to create gears which are interchangeable. Additionally, by reversing and stacking the gear profiles coaxially, it is possible to create a gear or gearing mechanism capable of transmitting torque bidirectionally.

IN THE DRAWING

FIG. 5b is an elevational view of the synchronous gearing mechanism of FIG. 5a as seen from the opposite planar side from that shown in FIG. 5a.

DETAILED DESCRIPTION OF THE PREFERRED EMBODIMENTS

Figure 1:
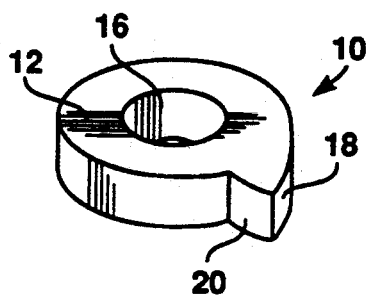
FIG. 1 is a perspective view of a high strength, limited rotation gear design in accordance with the preferred embodiment of the present invention.

Referring now to FIG. 1, shown is a perspective view of a high strength, limited rotation gear 10 in accordance with the preferred embodiment of the present invention. Gear 10 includes a first substantially planar surface 12 and a second substantially planar surface 14 (not shown), opposite surface 12 and essentially parallel thereto. An aperture 16 is formed through gear 10, perpendicular to opposing surfaces 12 and 14. As is implied by the drawing of FIG. 1, surface 12 and surface 14 are substantially identical to one another. A single gear tooth 18 is integrally formed with gear 10 and includes a single contact surface 20. As can be seen in the figure, tooth 18 is asymmetrically disposed with respect to aperture 16.

Figure 2:
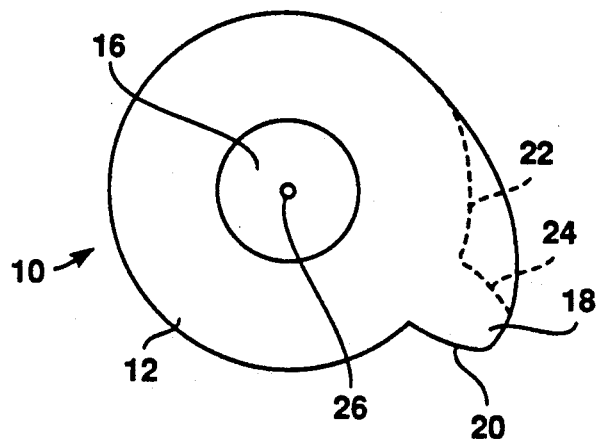
FIG. 2 is a top plan view of the gear in FIG. 1, illustrating a comparison between the present improved gear profile and a traditional gear profile.

To fully understand the asymmetrical nature of tooth 18, please refer now to FIG. 2 where there is illustrated a comparison between a gear profile in accordance with the present invention and a traditional gear profile. A traditional gear border profile 22 (shown in phantom) and traditional gear tooth profile 24 (also shown in phantom) have been included in the figure to facilitate this comparison. As is shown, the traditional gear is substantially similar to the present gear except for the respective configurations of the gear teeth. The traditional gear tooth is symmetrically disposed with respect to aperture 16 with each side of the tooth being equidistant from a central rotational axis 26. That is, the traditional gear tooth (indicated by profile 24) includes two oppositely facing contact surfaces, each of which lies approximately the same distance from axis 26.

In normal operation, each surface of the traditional gear tooth contacts a separate tooth of another gear and transmits or receives a given amount of torque. This torque is applied to the tooth at a moment measured from central axis 26 to approximately the center of the tooth. The bidirectional torque applies stress to the gear at its weakest point, where the tooth meets the main body of the gear, and where the least amount of material is available to provide structural support. By comparison, the tooth profile in accordance with the present invention provides added structural support by limiting the torque to a single rotational direction, and providing additional material to absorb the resultant stress in that direction.

Figure 3:
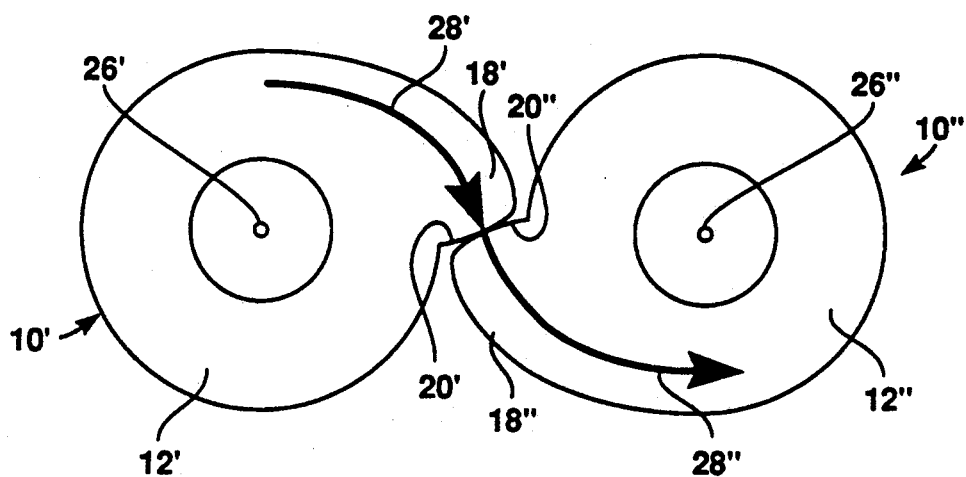
FIG. 3 is a top plan view of a gearing mechanism using a pair of high strength gears in accordance with the present invention illustrating the single torque transmission direction.

Referring now to FIG. 3, it can be readily seen how torque can only be efficiently transmitted in a single rotational direction using a high strength gear in accordance with the present invention. Additionally, it is readily apparent how the stress created by this torque is better distributed along the present gear profile than that of the prior art gear tooth. In FIG. 3, two separate but substantially identical gears 10' and 10" are shown, including planar surfaces 12' and 12", respectively. As is shown, contact surface 20' makes substantial contact with contact surface 20" as gear 10' is rotated in a clockwise direction (as indicated by arrow 28') about axis 26', forcing gear 10" to rotate in a counter-clockwise direction (as indicated by arrow 28").

As is also indicated by the arrows, the torque created when rotating gear 10' is distributed along the circumferential length of tooth 18' and 18", thus allowing the additional tooth material to absorb the stress created by the torque. This preserves the structural integrity of the gear, increasing the strength and reliability of the gear dramatically. Of course, it can also be readily seen that rotating gear 10" in a clockwise direction about axis 26' would force gear 10' to rotate about axis 26' in a counter-clockwise direction. The same force distribution as described above would apply equally in this situation. It is also important to note the unidirectional nature of this gear configuration. That is, rotation of gear 10' about axis 26' in a counter-clockwise direction would cause surfaces 20' and 20" to disengage and no torque would be transmitted to gear 10". Likewise, if gear 10" were rotated about axis 26" in a counter-clockwise direction, surfaces 20" and 20' would disengage and no torque would be transmitted to gear 10'.

Figure 4:
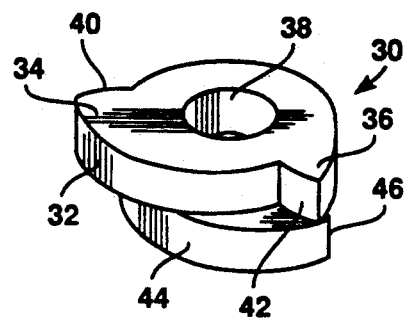
FIG. 4 is a perspective view of a bidirectional interchangeable gear design in accordance with the preferred embodiment of the present invention.

To provide a gear with the capability of transmitting torque bidirectionally, a gear profile as depicted in FIG. 4 is used. As can be seen, the same design principle has been used in constructing bidirectional gear 30 of FIG. 4 as was used in the construction of gear 10 depicted in FIG. 1, with two substantial differences. First, gear 30 comprises substantially two separate gear profiles similar to those of gear 10 wherein gear 30 has been rendered bidirectional by reversing and stacking the separate gear profiles. Second, as can be seen by reference to the figure, each of the separate gear profiles comprising gear 30 include two teeth, as opposed to the single tooth of gear 10.

Referring still to FIG. 4, a more detailed description of bidirectional gear 30 will be presented. Gear 30 substantially comprises a first gear profile 32 and a second gear profile 44. First gear profile 32 includes a first tooth 34 and a second tooth 36 in spaced apart relation relative to one another and radially disposed from a central aperture 38. First tooth 34 includes a first contact surface 40, and second tooth 36 includes a second contact surface 42, both contact surfaces being operative to apply torque to a complimentary gear tooth when rotated thereagainst (as described in further detail below). Second gear profile 44 includes a third tooth 46 and a fourth tooth 48 (not shown) in spaced apart relation relative to one another and radially disposed from central aperture 38 which extends through both gear profiles, 32 and 44. Third tooth 46 includes a third contact surface 50 (not shown) and fourth tooth 48 includes a fourth contact surface 52 (not shown), both contact surfaces being operative to apply torque to a complimentary gear tooth when rotated thereagainst.

It is important to note that teeth 34 and 36 of profile 32 are disposed to provide torque in an opposite direction in comparison to teeth 46 and 48 of gear profile 44. That is, contact surfaces 40 and 42 of teeth 34 and 36, respectively, are positioned to provide torque against complimentary teeth in contact therewith when gear 30 is rotated in a clockwise direction about an axis through the center of aperture 38. In contrast, contact surfaces 50 and 52 are positioned to provide torque against complimentary teeth in contact therewith when gear 30 is rotated in a counter-clockwise direction about axis through the center of aperture 38. Thus, gear profile 32 will provide no torque when rotated in a counter-clockwise direction, and gear profile 44 will provide no torque when rotated in a clockwise direction.

Figure 5A:
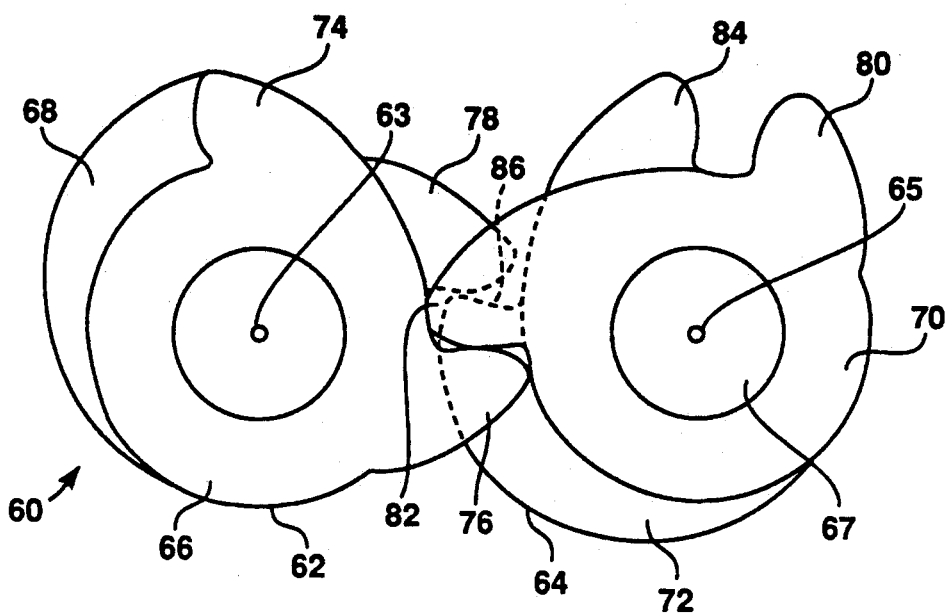
FIG. 5a is an elevational view of a synchronous gearing mechanism in accordance with the preferred embodiment of the present invention.
Figure 5B:
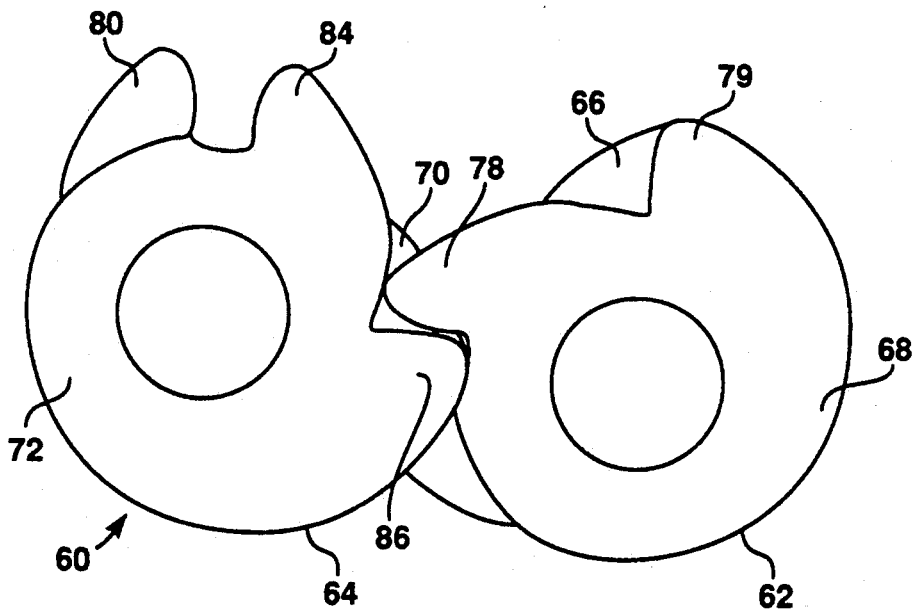

Referring now to FIGS. 5a and 5b, an illustration of the operation of a gearing mechanism 60 is presented in accordance with the preferred embodiment of the present invention. A novel feature of mechanism 60 is that it comprises two substantially identical bidirectional gears of the type depicted in FIG. 4. That is, only a single gear design is necessary to construct the bidirectional gearing mechanism 60 of FIGS. 5a and 5b, thus greatly increasing the simplicity of its manufacture and decreasing its overall production cost. Mechanism 60 generally comprises a first bidirectional gear 62 and a second bidirectional gear 64 with a portion of their respective teeth meshed together. By careful analysis of the drawing of FIG. 5a, it can be seen that gear 64 is identical to gear 62 and has simply been rotated about its central axis 65.

Gear 62 includes a first gear profile 66 and a second gear profile 68 (which lies beneath profile 66 in the orientation of mechanism 60 as depicted in FIG. 5a). Gear 64 includes a third gear profile 70, identical to profile 66, and a fourth gear profile 72 (which lies beneath profile 70 in the orientation of mechanism 60 as depicted in FIG. 5a) identical to profile 68. Profile 66 includes a first tooth 74 and a second tooth 76; profile 68 includes a third tooth 78 and a fourth tooth 79 (not shown); profile 70 includes a fifth tooth 80 and a sixth tooth 82; and, profile 72 includes a seventh tooth 84 and an eight tooth 86 (shown in phantom). FIG. 5b has been included to illustrate the relative orientations of the various features of gears 62 and 64 as they appear from the "flipside" of the view shown in FIG. 5a. That is, FIG. 5b shows the opposite side of mechanism 60 as it is depicted in FIG. 5a. The view of FIG. 5b also clearly illustrates that gear profile 72 and gear profile 68 are substantially identical, as described above.

Referring back now to FIG. 5a, the normal operation of mechanism 60 will be described in detail. Although either bidirectional gear 62 or 64 could be used to drive the other respective gear, let us assume for the purposes of illustration that gear 64 is used to drive gear 62. This could be done by coupling a drive shaft or similar means with gear 64 through aperture 67. Any appropriate drive methods could be employed and are well known in the art.

If gear 64 is rotated in a counter-clockwise direction about axis 65, the contact surface of tooth 82 will make substantial contact with the contact surface of tooth 76 of gear 62. It is, of course, assumed that gear 62 is rotatably secured about a central axis 63 such that no translational movement is possible. As tooth 82 is rotated into tooth 76, a torque is transmitted from tooth 82 to gear 62 causing it to rotate in a clockwise direction about axis 63. As can be seen by reference to the figure, this torque can only be transmitted between the gears in a limited range of motion. That is, tooth 82 and tooth 76 will only make substantial contact for a limited angular range of motion. In the preferred embodiment, this range of motion is approximately 20 degrees. Note that as gear 64 is rotated counter-clockwise, tooth 86 does not transmit torque to tooth 78. If gear 64 is rotated in a clockwise direction about axis 65, the contact surface of tooth 86 will make substantial contact with the contact surface of tooth 78. As tooth 86 is rotated into tooth 78, a torque is transmitted from tooth 86 to gear 62 causing it to rotate in a counter-clockwise direction about axis 63.

Note that when gear 64 is rotated in a clockwise direction, tooth 82 does not transmit torque to tooth 76.

One of the important advantages to the design of bidirectional mechanism 60 is that each of the component gears 62 and 64 are identical and thus easier to manufacture and are interchangeable. Another important feature is that mechanism 60 essentially comprises a synchronous gearing mechanism. That is, for a limited range of motion, rotating either gear causes the other gear to rotate a substantially identical amount. This feature can best be seen by reference to FIG. 6.

Figure 6:
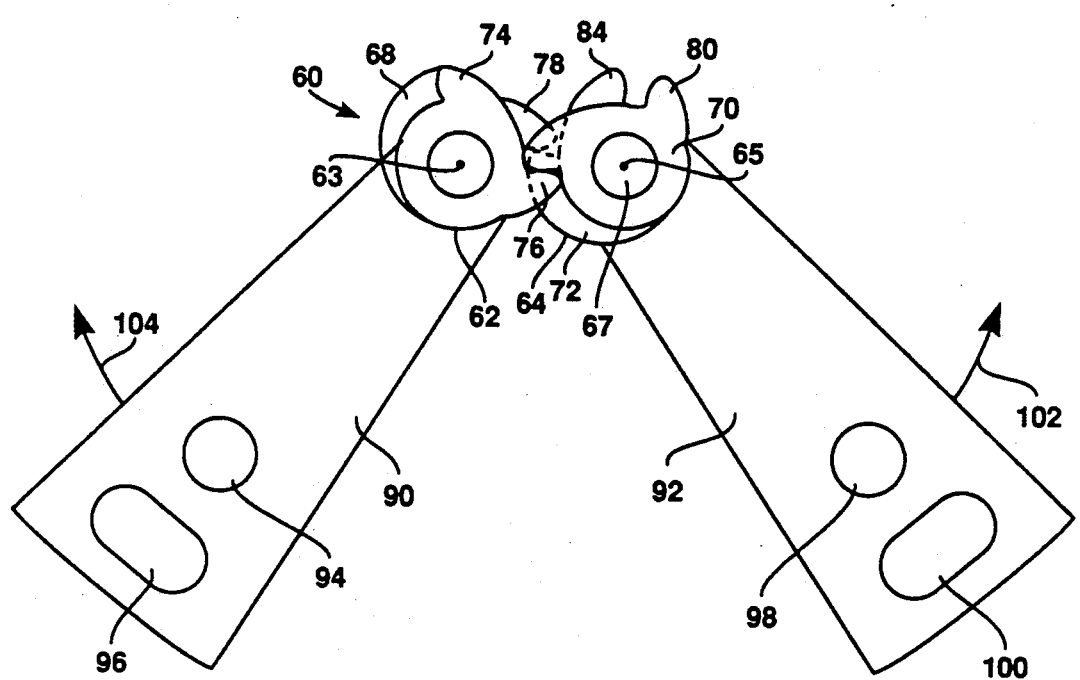
FIG. 6 is an elevational view of an alternative embodiment of a synchronous gearing mechanism in accordance with the preferred embodiment of the present invention.

Shown in FIG. 6 is an alternative embodiment of a synchronous gearing mechanism in accordance with the preferred embodiment of the present invention. As shown, bidirectional gear 62 has an additional moment element 90 attached thereto or integrally formed therewith. Likewise, bidirectional gear 64 has an additional moment element 92 attached thereto or integrally formed therewith. Moment element 90 includes a first aperture 94 and a second aperture 96 for connecting additional elements to gear 62 of gearing mechanism 60. Likewise, moment element 92 includes a third aperture 98 and a fourth aperture 100 for connecting additional elements to gear 64 of mechanism 60.

For the purposes of illustration, we will assume that each gear, 62 and 64, is rotatably secured about its respective central axis. In a normal operational configuration, the teeth of the bidirectional gears are meshed as shown in the figure, and as described in detail in relation to FIG. 5a. Thus, tooth 82 makes contact with tooth 76, and tooth 78 makes contact with tooth 86. If we apply a force to element 92 in the direction of arrow 102, gear 64 will rotate in a counter-clockwise direction about axis 65. This rotation will cause tooth 82 to transmit a torque to gear 62 via tooth 76, and cause gear 62 to rotate in a clockwise direction about axis 63. This rotation will cause element 90 to move in the direction indicated by arrow 104. Likewise, if we apply a force to element 90 in the direction indicated by arrow 104, gear 62 will rotate in a clockwise direction about axis 63. This rotation will cause tooth 78 to transmit a torque to gear 65 via tooth 86 and cause gear 64 to rotate in a counter-clockwise direction about axis 65. This rotation will cause element 92 to rotate in the direction indicated by arrow 102.

The mechanism will, of course maintain synchronous motion if a force is applied to either of the members in a direction opposite to that indicated by the arrows. That is, if a force is applied to element 92 in the direction opposite to that indicated by arrow 102, gear 64 will rotate in a clockwise direction about axis 65. This rotation will cause tooth 86 to transmit a torque to gear 62 via tooth 78, and cause gear 62 to rotate in a counterclockwise direction about axis 63. This rotation will cause member 90 to move in the direction opposite to that indicated by arrow 104. Of course, symmetry dictates that moving element 90 in the direction opposite to that indicated by arrow 104 will cause element 92 to move in the direction opposite to that indicated by arrow 102.

Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

What is claimed is:

1. A synchronous gearing mechanism, comprising:
   a first gear including a first gear profile having a first pair of asymmetrical teeth disposed about the perimeter of a first half of said first profile and a second gear profile having a second pair of asymmetrical teeth disposed about the perimeter of a second half of said second profile, said first profile for providing driving torque in a first rotational direction and said second profile for providing driving torque in a second rotational direction, opposite said first direction;
   a second gear including a third gear profile having a third pair of asymmetrical teeth, substantially identical to said first pair of teeth, disposed about the perimeter of a third half of said third profile and a fourth gear profile having a fourth pair of asymmetrical teeth, substantially identical to said second pair of teeth, disposed about the perimeter of a fourth half of said fourth profile;
   said first gear and said second gear being configured to intermesh and provide synchronous relative motion between each said gear when at least one of said gears is driven.

2. A mechanism as described in claim 1 wherein said first gear includes a first moment element for affecting rotation of said first gear, and said second gear includes a second moment element for affecting rotation of said second gear.

3. A mechanism as described in claim 1 wherein a first tooth of said first pair of teeth is disposed to make contact with a second tooth of said third pair of teeth, and a third tooth of said second pair of teeth is disposed to make contact with a fourth tooth of said fourth pair of teeth.

* * * * *